UNITED STATES PATENT OFFICE 2,474,294

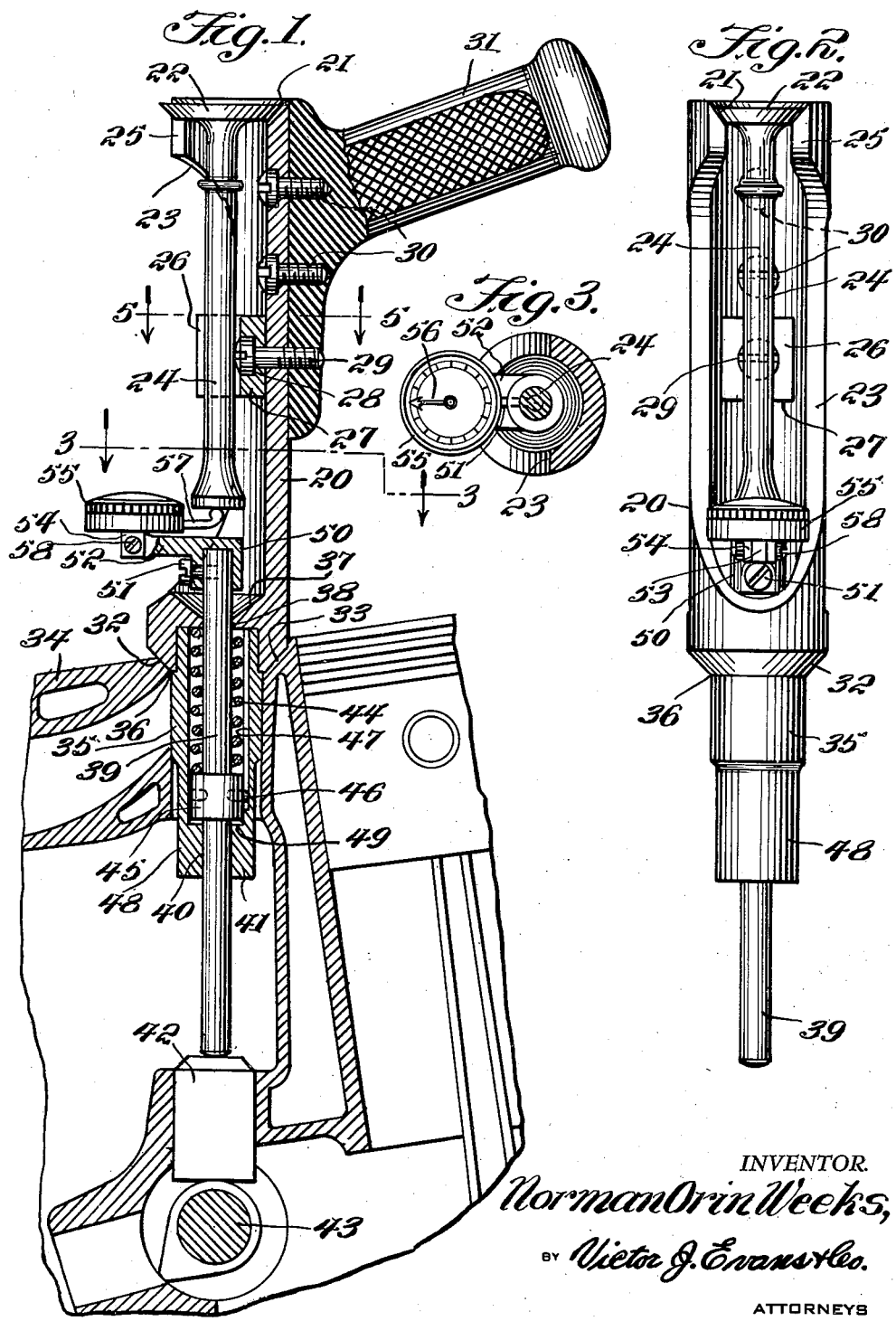

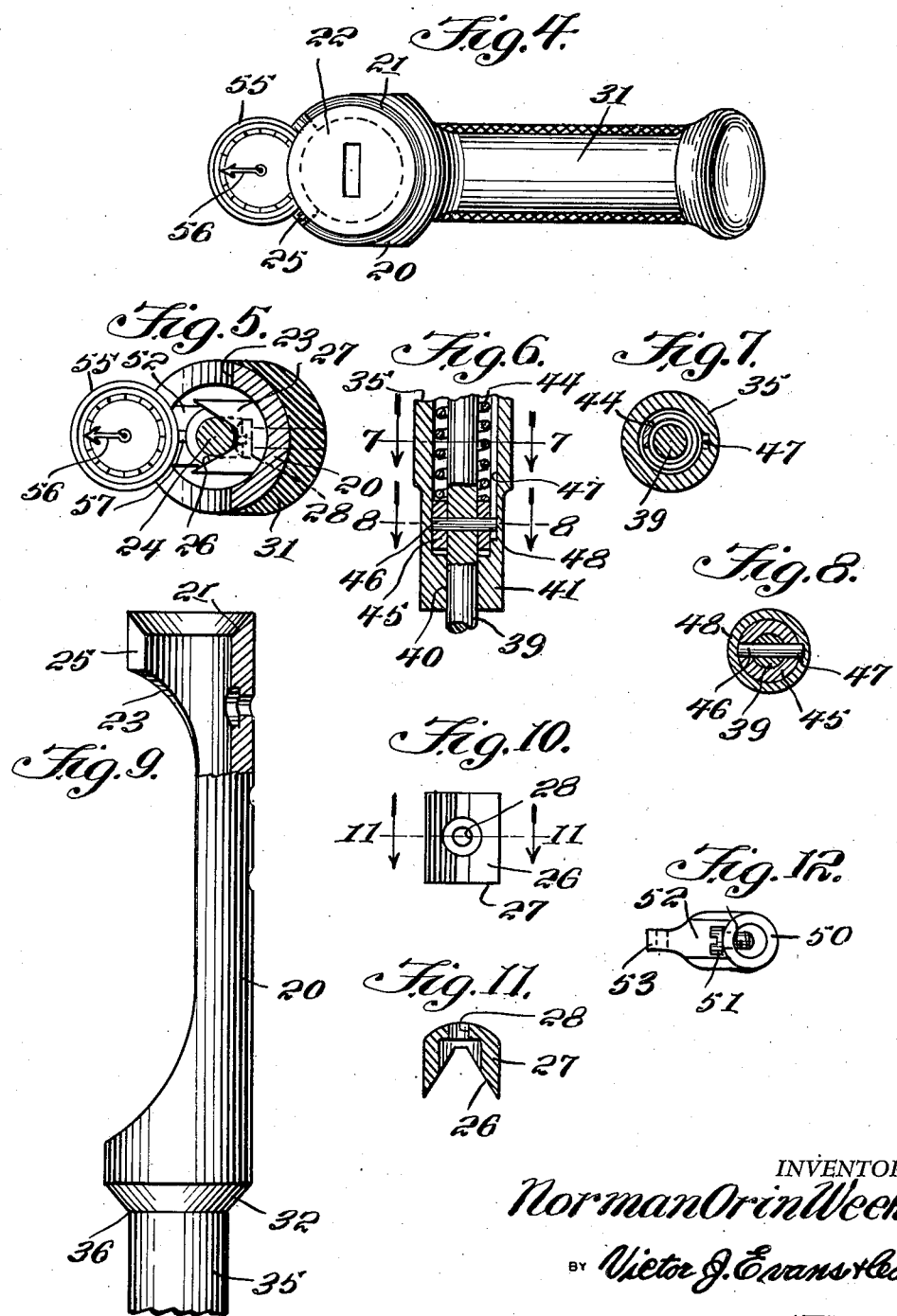

VALVE GAUGE

Norman Orin Weeks, Inglewood, Calif.

Application April 24, 1947, Serial No. 743,483

2 Claims. (Cl. 33—181)

1

This invention relates to a valve gauge that is especially adapted for use with a Ford V-8 combustion engine and any other type of combustion engine that has non-adjustable valves.

When grinding valves in a Ford V-8 combustion engine or other types of engines where the valves are non-adjustable, a feeler gauge is used to check the clearance by inserting the gauge into the valve chamber. This results in non-uniformity of grinding, and a valve grinding job that lacks the precision of an original factory job.

An object of the invention, therefore, is to provide a gauge of a type to be later described, that will simplify and shorten the usual operation by using a false seat above the original block seat and by means of a dial indicator obtain a precision operation that is similar in all respects to a factory built job.

With the above and other objects and advantages in view, the invention consists of the novel details of construction, arrangement and combination of parts more fully hereinafter described, claimed and illustrated in the accompanying drawings in which:

Figure 1 is a vertical sectional view of an embodiment of the invention in position in a motor block;

Figure 2 is an elevational view of the device, per se;

Figure 3 is a sectional view on the line 3—3 of Figure 1;

Figure 4 is a top plan view of the device;

Figure 5 is a sectional view on the line 5—5 of Figure 1;

Figure 6 is a detailed sectional view of the lower end of the device;

Figure 7 is a sectional view on the line 7—7 of Figure 6;

Figure 8 is a sectional view on the line 8—8 of Figure 6;

Figure 9 is an elevational view partly in section of the body or housing of the device;

Figure 10 is a plan view of the valve stem guide;

Figure 11 is a sectional view on the line 11—11 of Figure 10 and

Figure 12 is a bottom plan view of the indicator mounting arm.

Referring more in detail to the drawings, the reference numeral 20 designates the tubular body or housing of the device, which is provided at its upper end with a bevelled valve seat 21 to receive the valve head 22 of an internal combustion engine valve. The forward portion of the wall of the housing 20 is provided with a cutout 23

2 whereby the user of the device may insert the valve stem 24 of the valve head 22 into the housing so that the head may be properly seated in the seat 21, a slot 25 communicating with the cutout 23 to permit such operation.

The stem 24 will engage the inwardly bevelled V-shaped seat 26 of the guide block 27 which, by means of a central countersunk aperture 28, is screwed to the wall of the housing 20 by a fastener 29, and fasteners 30 secure a pistol type grip 31 to the rear of the wall of the housing 20.

The lower end of the housing 20 is bevelled at 32 so that it will conform to the valve seat 33 of the motor block 34, and a tubular sleeve 35, of a circumference to engage the valve guide throat of the block in which the sectional valve guide bushing is positioned, is press fit into the lower end of the housing 20, and is provided with an annular shoulder 36 which engages the lower end of the housing 20 within the circumference of the bevel 32.

A conical seat 37 in the lower end of the housing 20 communicates with a central bore 38 in which is slidably mounted the plunger rod 39 which passes through and extends outwardly of the sleeve 35 through a central bore 40 in the closed bottom 41 of the sleeve 35. The rod 39 extends downwardly to engage the valve lifter 42 of the motor 34 which is operated by contact with and rotation of the cam shaft 43 of the motor. A coil spring 44 mounted on the rod 39 engages the lower end of the housing 20 at its upper end, and a collar 45 on the rod 39 at its lower end. The spring forces the collar downwardly to maintain the rod 39 in contact with the lifter 42.

The collar 45 is fixed to the rod 39 by a pin 46 extending transversely of the collar and rod, and the pin is longer than the diameter of the collar, so that one end of the pin engages the vertical slot 47 in the inner surface of the sleeve 35 to prevent rotation of the rod 39. The portion of the sleeve 35 is reduced as at 48 where the sleeve carries the collar 45, and the collar in its lowermost point of travel will engage the inwardly extending shoulder 49 formed by the closed end 41 of the sleeve 35.

Mounted on the upper end of the rod is a cap 50 which is retained in fixed relation to the rod by a set screw 51 in the cap engaging the rod. An arm 52 is formed integral with the cap, and extends outwardly of the housing through the cutout 23 at right angles to the cap 50. The outer end of the arm is provided with a reduced apertured portion 53 which receives the opposed depending ears 54 of the indicator 55, which is of the dial type, having a rotating arrow 56 coacting with the dial which is caused to rotate by means of an arm 57 which extends outwardly at right angles thereto to engage the lower end of the valve stem 24, a pin bolt 58 effecting the connection of the portion 53 and ears 54 for pivotal movement of the arm 52.

In operation, the gauge is inserted into the block 34 so that the rod 39 will engage the lifter 42. A valve is placed in the housing 20 with the stem in contact with the arm 57. The valve is now seated in the false seat 21 of the housing 20, and movement of the cam shaft will then move the rod to cause the valve to rise and fall as if the valve were positioned in the seat 33 of the motor 34.

The arm 57 will cause the arrow 56 in the indicator to rotate and the coaction of the arrow with the dial will indicate the clearance of the valve 22 from the seat 21. Since the valves for Ford motors are non-adjustable, except by grinding the length of the valve, until the proper clearance is obtained, a valve ground and then placed in the tool as described can be checked and reground and rechecked until a proper clearance can be attained when the valve is again replaced in the block 34. Thus the clearance can be obtained with precision, and the valve will be properly seated when again mounted in the block.

There has thus been provided a device which, it is believed, will accomplish the objects of the invention, and it is believed that from the foregoing description, the operation and construction of the device will be apparent to those skilled in the art.

It is also to be understood that changes in the minor details of construction may be resorted to, provided they fall within the spirit of the invention and the scope of the appended claims.

Having thus described the invention, what is claimed as new and desired to be secured by Letters Patent is:

1. A device of the character described, for gauging valves for internal combustion engines having stems, comprising a tubular body member adapted to receive the stem of the valve, a bevelled seat at the upper end of the body to receive the valve head, a sleeve secured to the lower end of the body, a plunger rod slidable in said sleeve and protruding from the lower end of said sleeve, a spring pressing said plunger rod downwardly and an indicator mounted on said rod externally of said sleeve and laterally of said rod, an operating arm carried by the indicator and extending into the vertical line of the stem, and adapted to engage the stem of said valve and cause the indicator to operate to indicate the proper clearance between the valve head and the seat at the upper end of the body.

2. The invention as in claim 1, wherein means is provided on the upper end of said rod for mounting said indicator, and means is provided on said rod to prevent rotation of said rod, but not limit the up and down movement thereof.

NORMAN ORIN WEEKS.

REFERENCES CITED

The following references are of record in the file of this patent:

UNITED STATES PATENTS

| Number | Name | Date |
|---|---|---|
| 2,105,502 | Pointer | Jan. 18, 1938 |
| 2,192,069 | Cox | Feb. 27, 1940 |
| 2,217,952 | Huggins | Oct. 15, 1940 |
| 2,306,489 | Mortensen | Dec. 29, 1942 |
| 2,312,222 | Tanner | Feb. 23, 1943 |
| 2,325,170 | Bauer | July 27, 1943 |